July 16, 1940.    J. B. RAUEN    2,207,895
FENDER GUARD
Filed Jan. 20, 1938
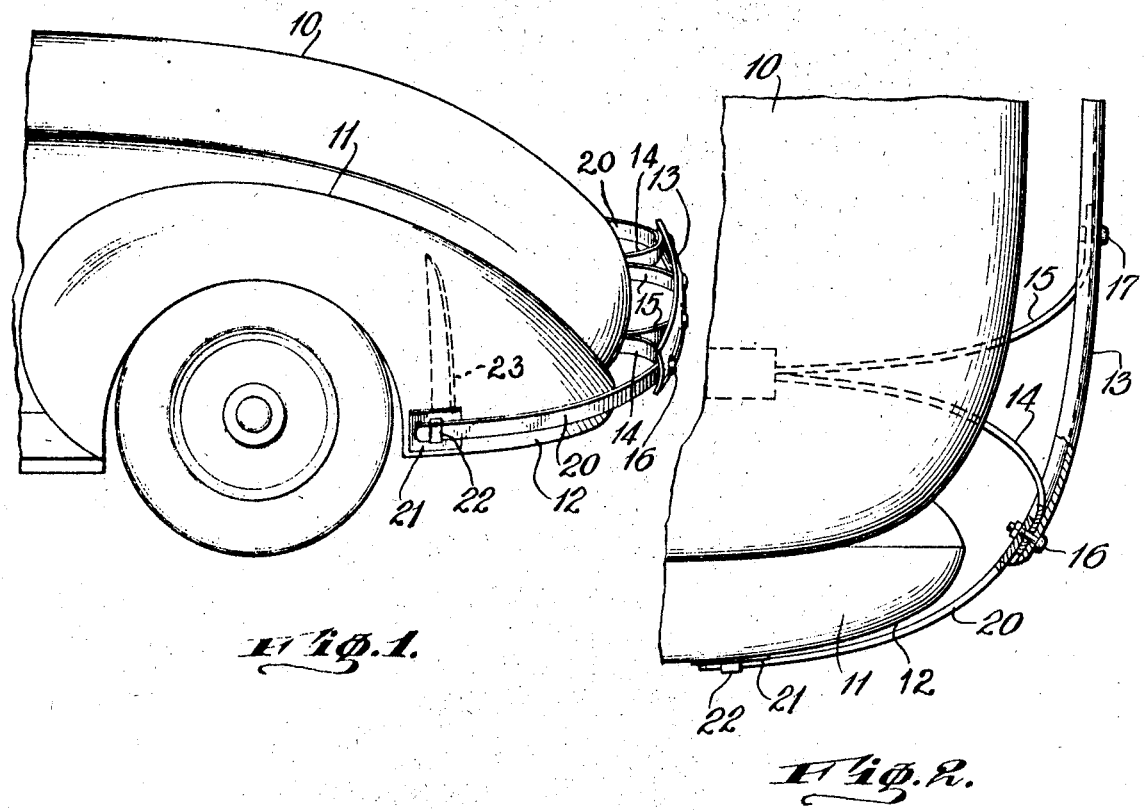
Fig. 1.
Fig. 2.
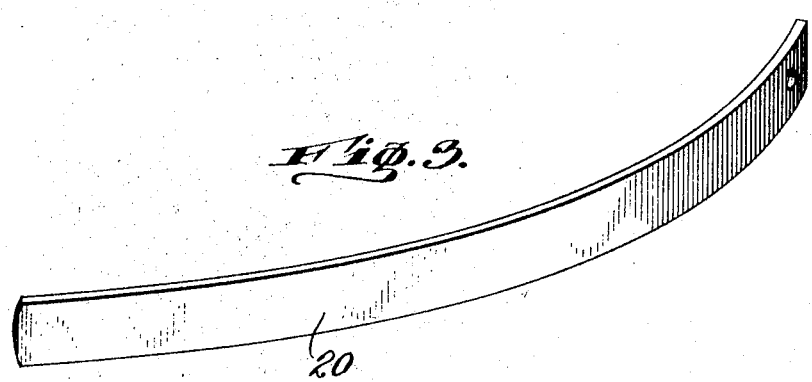
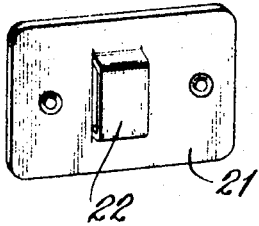
Fig. 4.
Fig. 3.
INVENTOR
JOHN B. RAUEN
BY
ATTORNEY Patented July 16, 1940

2,207,895

UNITED STATES PATENT OFFICE 2,207,895

FENDER GUARD

John B. Rauen, Los Angeles, Calif., assignor to American Chain & Cable Company, Inc., Bridgeport, Conn., a corporation of New York Application January 20, 1938, Serial No. 185,847

8 Claims. (Cl. 293—55)

This invention relates to improvements in motor vehicle fender guards. Front and rear wheel fenders of conventional designs are provided with relatively deep and long skirts of thin sheet material easily distorted and crushed by sidewise and endwise impacts. I have illustrated my invention applied to a conventional form of rear wheel fender of arcuate cross section and comprising a skirt formed as a continuation or integral part of the main body of the fender.

Broadly one object of my invention is to provide improved means for protecting fenders against impacts generally and more specifically for protecting the skirts of fenders against impacts.

An object of this invention is to provide improved protective means for fenders generally and more specifically to provide a guard for protecting the conventional relatively deep flanges or skirts of wheel fenders.

Another object of this invention is the provision of a fender guard which may be supported at one end on the fender skirt by means which preferably supports the main portion of the fender guard in spaced relation to the fender skirt, and which may be supported at its other end on any part of the automobile and more particularly on the rear end bumper.

A more specific object of this invention is the provision of a fender guard for protecting the rear end and side of a rear wheel fender together with means for supporting one end of the fender guard on a conventional form of rear end bumper, and the other end of the fender guard on the skirt of the fender by a slidable connection which permits unrestricted functional movement of the rear end bumper.

Other objects of the invention will appear from the following description taken in connection with the drawing, in which—

Fig. 1 is a side view of the rear end of a conventional form of automobile showing my improved fender guard mounted in position;

Fig. 2 is a top plan view of the rear end of the automobile showing my improved fender guard, its connection with the conventional form of bumper bar being shown in section;

Fig. 3 is a perspective view of my improved fender guard; and

Fig. 4 is a perspective view of the pad for supporting one end of the fender guard on the rear wheel fender.

For the purpose of disclosing my invention, I have disclosed the rear end of an automobile of conventional design indicated by 10 provided with a rear wheel fender 11 also of conventional design. This fender is provided with a relatively deep and long skirt 12 which extends from a point adjacent the rear side of the rear wheel to a point substantially in line with the side of the automobile body. As is well known, this skirt is made of relatively thin material, easily distorted by side and end impacts.

I have also disclosed a conventional form of bumper bar 13 which may be mounted on the automobile frame by the usual spring brackets or arms 14 and 15 connected to the bumper bar 13 by bolts 16 and 17.

My improvement consists of a fender guard shown at 20, in perspective in Fig. 3, which is supported at one end on the bumper bar 13 by the bolt 16 Figs. 1 and 2 by means of which it may be rigidly secured to the bumper bar. The fender guard is preferably, though not necessarily, made of spring steel and is curved as indicated to extend laterally substantially on the same arc as the free end of the bumper bar and in spaced relation to the fender skirt 12 terminating at a point adjacent the free forward end of the fender skirt where it is preferably supported on the fender skirt 12 by a bracket or pad 21 provided with a loop or strap 22 freely receiving the forward end of the fender guard 20 providing for relative sliding movement of the fender guard and therefore providing for unrestricted functional movement of the bumper bar 13. The pad 21 may be secured to the fender skirt by rivets and preferably close to the usual bracket or plate 23 which braces and supports the fender skirt against lateral movement. The pad 21 is made relatively large so that impacts transmitted thereto by the fender guard may be absorbed by the fender skirt without distortion of the skirt.

I have disclosed the fender guard 20 as an accessory which may be applied to existing forms of automobiles and bumper bar equipment by connecting the same at one end to a bumper bar supporting bolt 16 and by connecting the same at the other end to a fender skirt by a bracket or pad which may be readily riveted or otherwise secured to the fender skirt. It is obvious, of course, that this fender guard could be made integral with the spring bracket 14 or formed as an integral extension of the bumper bar 13 and could be installed at the factory as original equipment, and that the shape and dimension of this guard may be varied in accordance with the distance between the bumper bar and the rear end of the automobile and the point at which the bumper bar terminates with respect to the rear end of the fender and also in accordance with the shape, extent and lateral location of the fender skirt. If desired, of course, the end of the guard which is attached to the bumper bar may be curved to conform to the transverse curvature of the bumper bar and the guard and pad may be finished to conform with the finish of the bumper bar 13. It is obvious, of course, that the guard may be modified for attachment to any type of yieldably or rigidly supported bumper bars and that the guard may also be attached to a rigid part of the frame or other part of the automobile and may be used, for example, as a protecting means for the skirts of front wheel fenders. I prefer to space the guard from the fender in order that the guard may yield under impact with respect to the fender and cushion the transmission of shocks to the fender skirt and bumper bar. The spring arms supporting the bumper bar effectively absorb shocks transmitted thereto through the fender guard.

While I have disclosed a single embodiment of my invention in connection with a conventional type of automobile body and rear wheel fender and rear bumper, it is to be understood that this has been done for the purposes of illustration and is not to be construed as restrictive or limitative and that I reserve the right to make such changes as properly fall within the scope of my invention and the claims hereto appended.

I claim:

1. In combination with a wheel fender provided with a depending skirt having a lower horizontal edge, and a movable bumper bar, of a fender guard overlapping the lower portion of said skirt near said edge, and means connecting said guard to said bar and said guard to said fender near the free end of the skirt of said fender, said means providing for unrestricted functional movement of said bar.

2. In combination with a flanged wheel fender and a movable bumper bar, of a fender guard in the form of an elongated bar connected to said bumper bar and overlapping the side flange of said fender, and a pad of greater dimensions than the height of said guard secured to the flange of said fender and provided with means slidably supporting said guard to provide for unrestricted movement of said bumper bar.

3. In combination with a wheel fender provided with a depending skirt, and a movable bumper bar, of a fender guard, means rigidly connecting said guard to said bar, and means slidably connecting said guard to the free end of said skirt for movement in the direction of the length of said skirt.

4. In combination with a wheel fender provided with a horizontally curved depending skirt and a bumper bar provided with an end curved in the general direction of said fender skirt, of a guard curved at one end to conform substantially to the curved end of the bumper bar, means connecting the curved ends of said guard and bumper bar, the guard having substantially less curvature at its other end, and means connecting said other end of said guard to said fender in laterally spaced relation thereto for slidable movement in the direction of its length.

5. The combination with a vehicle equipped with wheel fenders provided with relatively deep and long depending skirts, of a vehicle bumper and fender guard construction comprising an impact receiving bar extending transversely of the vehicle and along the sides of said depending skirts, means yieldably supporting the same on the vehicle and means slidably supporting the ends of said impact receiving bar on said depending skirts for movement in the direction of the length of said skirt.

6. The combination with a vehicle equipped with wheel fenders provided with relatively deep and long depending skirts, of a vehicle bumper and fender guard construction comprising an impact receiving bar extending transversely of the vehicle, spring brackets supported on the vehicle and extending outwardly laterally toward the sides of the vehicle, fender guards extending along the sides of said skirts and connected to said impact bar and spring brackets, and means supporting said fender guards on said skirts.

7. In combination with a wheel fender provided with a relatively deep depending skirt having a lower horizontal free edge, a bumper impact bar lying in a horizontal plane intersecting said skirt in proximity to said edge, of a horizontal fender guard lying in the horizontal plane of said bumper bar and overlapping said bumper bar and extending in spaced relation along the side of said skirt, means securing one end of said guard to said bar, and means securing and supporting the other end of said guard on said skirt, the intermediate portion of said guard being free to move and flex relatively to said skirt in a horizontal plane.

8. In combination with a wheel fender provided with a relatively deep depending skirt having a lower horizontal free edge, a bumper impact bar lying in a horizontal plane intersecting said skirt in proximity to said edge and provided with an end curved toward the fender skirt, a horizontal fender guard conforming substantially to the shape of the side of the fender skirt and having one end curved to conform to the curvature of the end of said bar, and means connecting the ends of said guard to said bumper bar and skirt, the intermediate portion of said guard being spaced from and free of connection with said skirt, one of said connections providing for relative sliding movement between the connected parts.

JOHN B. RAUEN.